Nov. 22, 1960 A. MORO 2,961,230
APPARATUS FOR INDICATING SPEED ON RECTILINEAR SCALES IN
TACHOMETERS, PARTICULARLY FOR SELF-PROPELLED VEHICLES
Filed May 25, 1956 3 Sheets-Sheet 1
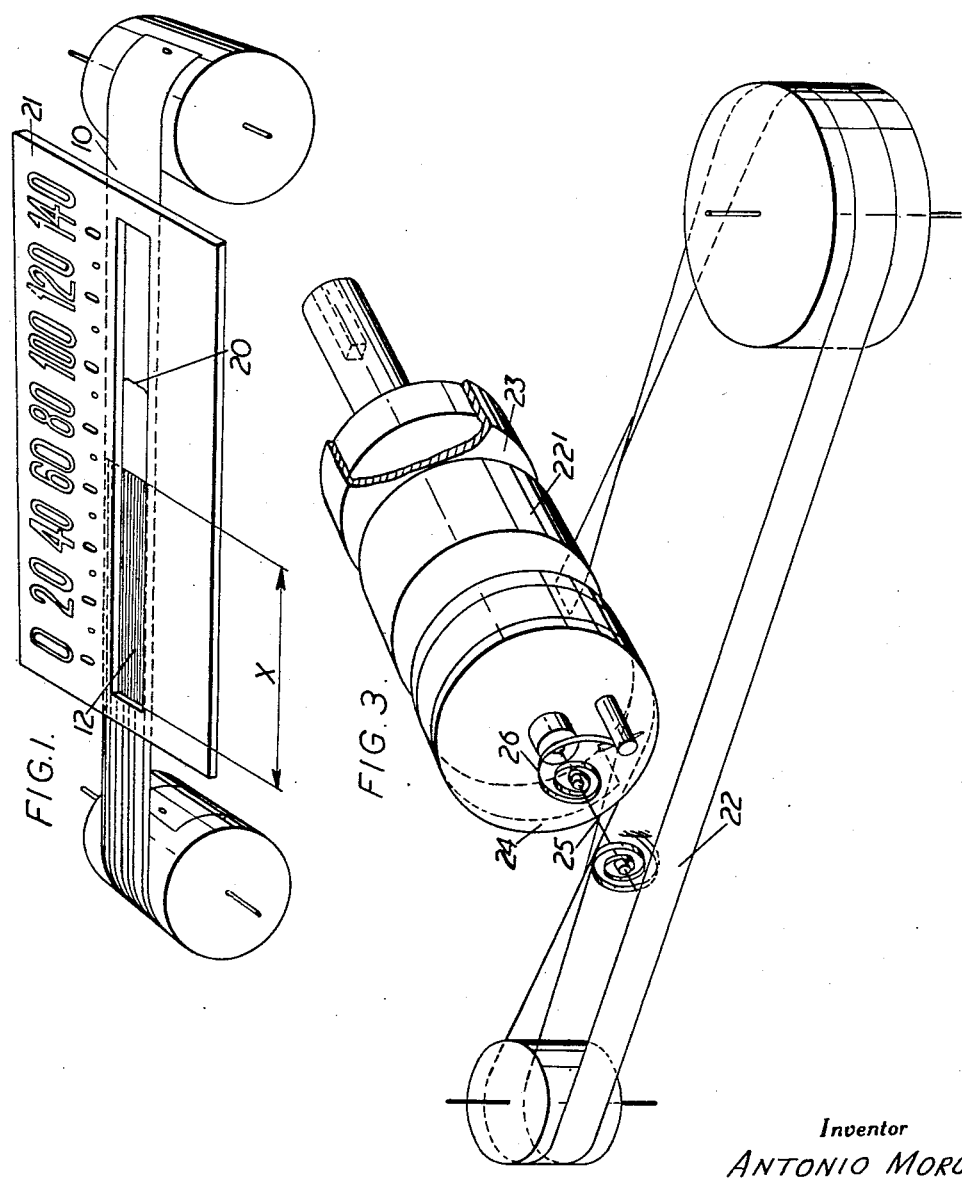
Inventor
ANTONIO MORO
By Irvin S. Thompson
Attorney

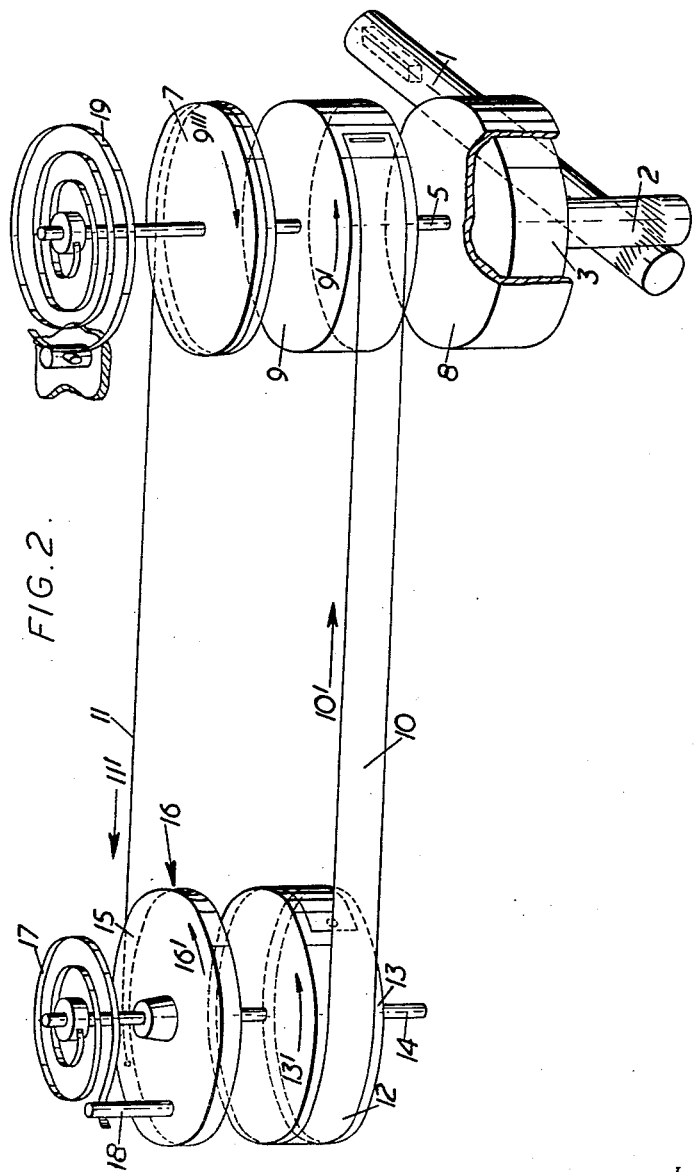

Nov. 22, 1960 A. MORO 2,961,230
APPARATUS FOR INDICATING SPEED ON RECTILINEAR SCALES IN
TACHOMETERS, PARTICULARLY FOR SELF-PROPELLED VEHICLES
Filed May 25, 1956 3 Sheets-Sheet 3
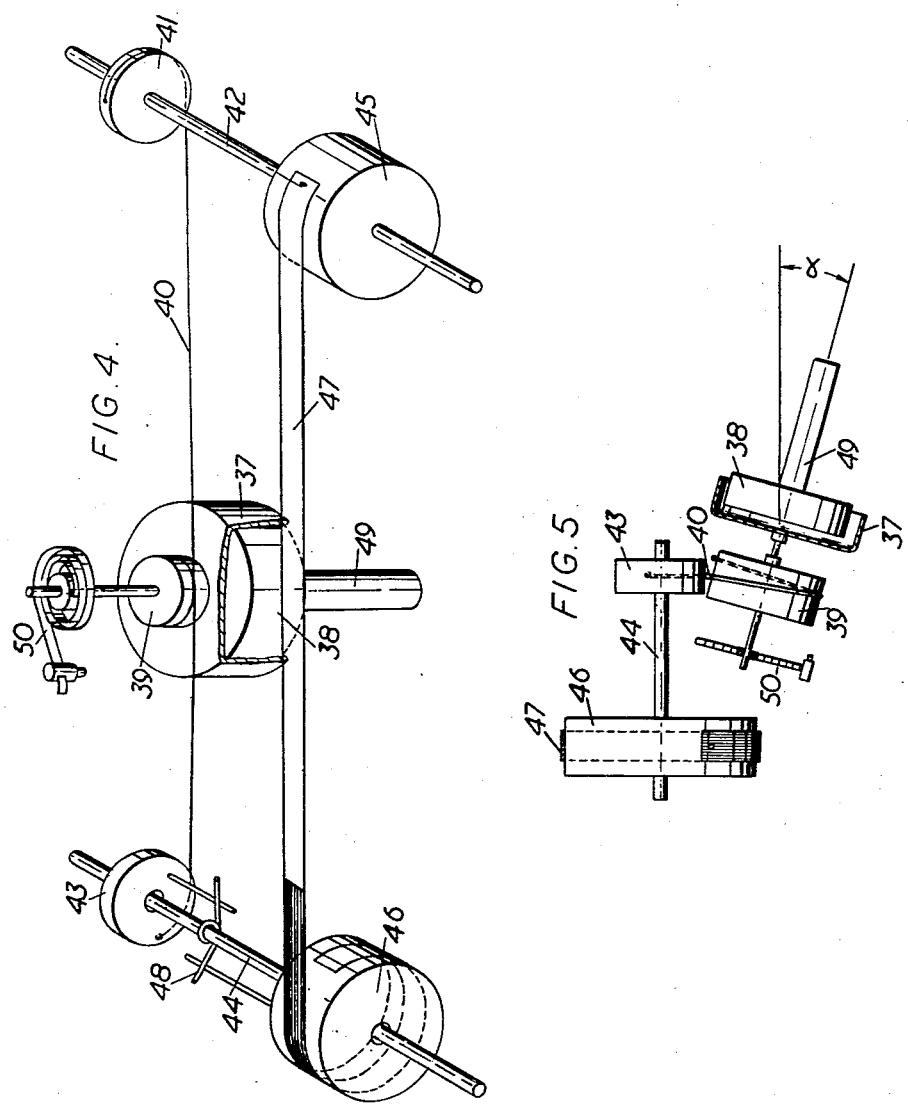
Inventor
ANTONIO MORO
By Irwin S. Thompson
Attorney United States Patent Office 2,961,230
Patented Nov. 22, 1960

2,961,230

APPARATUS FOR INDICATING SPEED ON RECTI-
LINEAR SCALES IN TACHOMETERS, PARTICU-
LARLY FOR SELF-PROPELLED VEHICLES

Antonio Moro, Milan, Italy, assignor to F.lli Borletti
S.p.A., Milan, Italy

Filed May 25, 1956, Ser. No. 587,374

Claims priority, application Italy May 25, 1955

6 Claims. (Cl. 73—519)

In tachometers for speed indication the pointer is moved generally over a scale disposed along an arc of a circle. This type of scale, above all in the case of tachometers mounted on self-propelled vehicles, is of very small convenience when the speed of the self-propelled vehicle is low or very high because the pointer which finds itself substantially deviated from the vertical, obliges the driver to turn his head to make the reading, which may be dangerous for the conduct of the vehicle.

This danger can be eliminated by employing a speed indicator with a rectilinear graduation.

The present invention is concerned with apparatus for indicating speed on a rectilinear scale for tachometers, particularly, for self-propelled vehicles, which, unlike known tachometer apparatus with analogous reading systems, provides a structure adapted to insure, by simple means, a perfectly regular functioning with no errors and permitting a very easy reading.

The apparatus is characterized by the fact that a ribbon carrying an indicating mark and arranged in such a manner as to be put into motion by the sensitive element of the tachometer when this element turns, is combined on the one hand with means adapted during its movement to permit it to slide along a graduated rectilinear scale in one sense or the other according to the direction of rotation of the said sensitive element, and on the other hand with means arranged to maintain the desired tension during its sliding movement.

In a first embodiment the flexible ribbon fixed at one of its ends to the cylindrical sensitive element or roller of the tachometer is fixed at the other end to a second idler roller in such a manner that the ribbon is unrolled from one of the rollers and is rolled on to the other or vice versa, for more than one turn if such should be the case, while a second ribbon, or even a simple wire connecting the two rollers, maintains the first ribbon in tension, in rolling on to and off the rollers in a sense opposite to the sense of the first ribbon in such a manner as to constitute with the first ribbon a closed reversible transmission system.

To keep the ribbon indicator in constant tension during its movement in the two senses the idler roller is mounted on a support which can oscillate about an eccentric axis or else slide in a guide; a spring, appropriately adjusted, ensuring correct tension of the ribbon indicator and of the wire, or ribbon, connecting in equilibratory fashion the two rollers or pulleys.

It is also possible and sometimes preferable for obtaining constant tension of the ribbon indicator to form the idler pulley by two pulleys, of which one is mounted freely on the spindle of the other and connected between them a spiral restoring spring in such a manner that the indicator ribbon and the connecting wire form a closed elastic transmission suitable to ensure a substantially constant tension of the indicator ribbon to a desired value. In another embodiment of the invention the indicator ribbon is simply guided by two idler pulleys and its two ends are fixed to a pulley whose axis is normal to those of the idler pulleys driven by the sensitive element of the tachometer; it is this pulley which is, in this case, preferably formed by two pulleys of which one is free on the shaft of the other, said pulleys being connected between themselves by a spring which always maintains the indicator ribbon in correct tension.

The two embodiments which will be described hereinafter function very well in practice.

But in the case of the first embodiment in which the magnet-carrying spindle is coaxial with one of the indicator ribbon rollers, it is necessary, in certain applications, to employ gearing to give to the driving spindle a direction different from that of the magnet-carrying spindle.

This gearing is unnecessary in the second embodiment where nothing prevents the magnet-carrying spindle from presenting different inclinations with respect to the axes of the ribbon rollers. It is however to be observed that this second form of the invention may be found to have practical limitations because of the dimensions required of the roller on which the extremities of the index carrying ribbon are fixed and of the fact that the ends of this ribbon are moved in different planes from that in which the indicating mark of this ribbon slides.

The difficulties do not exist in a third, simplified form of the invention adapted to function perfectly in whatever condition of application.

This simplified form is characterised in that the sensitive element (cap magnet cover) of the tachometer placed between two guide rollers for the indicator ribbon, carries a small cylinder which is established coaxially with this element and on which is wound a wire for pulling this ribbon, the wire being, at its two ends, fixed to two small pulleys coaxial with the said rollers arranged in such a manner as to receive their rotational motion from the wire.

As this small cylinder is coaxial with the magnet-carrying spindle and it is tangential to the tension wire the axis of the group-small cylinder, magnet-carrying spindle can occupy any position whatever according to the exigencies of mounting, in a plane parallel to the axis of the said rollers and without the need for gearing.

In the apparatus according to the invention the indicating mark of the indicator ribbon is formed by an index carried by the ribbon or by one part along the length of the ribbon being of a different colour from the remaining part. The index or the dividing line between the two parts of different colours is moved in proportion to the speed of the sensitive measuring element of the tachometer under a window of elongated form, graduated in speed values, and the position shown by the index or the said line indicates the instantaneous value of the speed. The system using the different colours is preferable to that using the index because in the coloured system a coloured band of ribbon of a length proportional to the measured speed is visible at each instant through the window which provides an easy reading without uncertainties.

The object of the invention is illustrated by the embodiments shown by way of example in the accompanying drawings, in which Fig. 1 is a perspective view of a dial with a rectilinear graduation having an elongated window under which the ribbon indicator slides.

Fig. 2 shows in perspective a scheme of one practical form of apparatus according to the invention, Fig. 3 shows a scheme in perspective of another practical form of apparatus according to the invention, Fig. 4 shows in perspective a scheme of a third embodiment of the invention substantially simplified, and Fig. 5 shows a side view, partly in cross-section, of the apparatus according to Fig. 4 shown with the magnet-carrying spindle and the sensitive element of the tachometer inclined.

Taking into consideration Figs. 1 and 2 of the above mentioned drawings, the motor spindle 1 transmits its movement to the hollow magnet-carrying spindle 2 on which the magnet 3 is mounted. Through the interior of the hollow spindle 2 passes the pivot 5 (Fig. 2) which is mounted free to turn.

On the pivot 5 are mounted a disc or cylinder 8, roller 9, and pulley 7. Cylinder 8 and roller 9 are made of magnetic material. On the roller 9 is wound one extremity of a ribbon 10, and one extremity of a wire or thread 11 is wound on pulley 7, this wire being wound in the opposite direction to the direction of the ribbon 10. The roller 9 may be also of non-magnetic material, for example synthetic resin.

The other extremity of the ribbon 10 being the part 12 of a different color from that of the other part is wound on a roller 13 rigidly fixed to the spindle 14 on which the pulley 15 is mounted, free to turn, the other extremity of the wire 11 being mounted in groove 16 of pulley 15.

To the spindle 14 is fixed one end of the spiral 17 the other end of which is fixed to the pivot 18 locked to the pulley 15, in such a manner that whatever the angular position of the pulley 7 the spiral 17 maintains in tension the ribbon 10 and the wire 11.

The operation of the apparatus is obvious:

During rotation of the spindle 2 the cylinder 8 and roller 9 are put into rotation, as is well known in magnetic tachometers because of the Foucault currents induced in the cylinder 8 in the magnetic material, in overcoming the resistance of the restraining spring 19 in such a manner that the angular displacements of the cylinder 8 and roller 9 are proportional to the speed of rotation of the spindle 2, that is to say of the vehicle.

Thus the ribbon 10, which presents over a certain length (zone 12) one color, for example red, which contrasts with the color, for example, white, of the zone 10 in being displaced towards the right along the window 20 of the dial 21, will indicate by the line of demarcation between the two colors the value of the speed of the self-propelled vehicle, and through the window 20 there will be observed the part X of the ribbon colored in red of a length proportional to the instantaneous value of the speed given by the tachometer.

The spiral 17 compensates the variations of tension in the ribbon and in the wire which can take place by the fact that the ribbon may be wound by more than one turn on the pulleys causing the diameter in the zone of its winding to vary, and it compensates also the small eventual variations in length caused by irregularities of mounting or variations in temperature etc.

During operation the wire 11 is displaced towards the left and the ribbon 10 towards the right in such a manner that continuity of liaison is assured. It will readily be appreciated in observing Fig. 2 that if, for example, the roller 9 turns in the direction of the arrow 9' it exerts a traction on the ribbon following the arrow 10' making the roller 13 turn following the arrow 13'. The roller 13, in its turn, by means of the spring 17, puts in rotation the pulley 15 following the arrow 11'. If moreover the roller 9 turns in a direction opposite to the arrow 9', the pulley 7, turning in the direction of the arrow 9''', carries the wire 11 in the opposite direction to the arrow 11', making the pulley 15 and, by means of the spring 17, the roller 13, turn in the opposite direction to the arrow 13' in such a manner as to produce displacement of the ribbon towards the left.

In Fig. 3 is shown a variation of the apparatus described above which does not need countershaft gearing for driving the magnet, this variation permitting the magnet and the drive to be in different relative positions on the self-propelled vehicle in dependence upon different mounting exigencies.

In this case there is only the ribbon 22, of which one end is fixed to the roller 22' solidly with the disc or cylinder 23 (sensitive measuring element of the tachometer) in which the parasitic currents are induced, while the other end is fixed to the roller 24, mounted free to turn on the spindle of the roller 22'. On the latter is, in addition, fixed the spiral spring 26, which keeps, at each instant, in tension the ribbon 22 in a manner analogous to that which has been described for the preceding form of the invention.

In the simplified form of realization of the invention shown in Figs. 4 and 5, to the cap 37, in which are induced the Foucault currents during rotation of the magnet 38, is fixed the cylinder 39 on which the wire 40 winds or unwinds, one end of the wire 40 being wound on the pulley 41 fixed on the shaft 42, the other end being wound on the loose pulley 43 on the shaft 44. The wire 40 is fixed to the two pulleys 41 and 43 in such a manner that whether winding or unwinding these take place in the opposite direction to the winding and unwinding of the ribbon indicator 47 on the rollers 45 and 46 mounted respectively fixed on the shaft 42 and free on the shaft 44.

The spring 48 maintains at each instant in tension the wire 40 and the ribbon 47.

The operation of this apparatus is as follows:

During rotation of the spindle 49 on which the magnet 38 is fixed, currents are induced in the cap 37, and this cap together with the cylinder 39 in overcoming the resistance of the opposing spring 50 turn in proportion to the speed of rotation of the spindle 49 and consequently to the speed of the vehicle.

Thus the cylinder 39 displaces the wire 40 which in its turn rotates the pulley 41.

Consequently the ribbon 47 is displaced in proportion to the angular displacement of the sensitive element 37.

If the exigencies of mounting on the vehicle are such that it is necessary to displace the indicator drive and to incline the drive at a given angle, the apparatus (Fig. 5) permits such displacement between the two ribbon guide rollers and such inclination in a plane parallel to the axes of the rollers.

In effect the spindle 49 and the sensitive measuring element 37 (Fig. 4) can be displaced towards the left or the right and they can be inclined (Fig. 5) by turning them about the wire 40 through any desired angle $\alpha$.

The embodiments that have been described are only examples and it is to be understood that other embodiments can be realized with modifications and changes in construction without departing from the invention. It is to be observed at the same time that although in the foregoing description the case has been particularly treated of the application of an arrangement according to the invention to a magnetic tachometer, it will readily be appreciated that the apparatus can also be applied effectively to a tachometer of known mechanical type.

What I claim is:

1. Apparatus for indicating speed on a rectilinear scale in tachometers, particularly for self-propelled vehicles, comprising a rectilinear graduated scale, a ribbon carrying an indicating mark, a pair of rollers mounted on shafts supporting said ribbon for movement parallel to said scale, a spring-biased speed-indicating element for moving the ribbon in such a manner that the angular displacement of the speed-indicating element is proportionate to the speed of the vehicle, a pair of pulleys mounted on said shafts, one of the said pulleys being restrained to move with one of the said rollers, the other of said pulleys being free to move angularly in relation to the other of the said rollers, a balancing wire wound on said pulleys, and a spring biasing said other pulley relative to said other roller to maintain tension between said balancing wire and said ribbon.

2. Apparatus for indicating speed on a rectilinear scale in tachometers, particularly for self-propelled vehicles, comprising a rectilinear graduated scale, a ribbon carrying an indicating mark, a pair of rollers mounted on shafts supporting said ribbon for movement parallel to said scale, a spring-biased speed-indicating element for moving the ribbon in such a manner that the angular displacement of the speed-indicating element is proportionate to the speed of the vehicle, a pair of pulleys mounted on said shafts in alignment with the pair of rollers, respectively, one of the pulleys being free to move angularly in relation to one of the said rollers, the other of said pulleys being restrained to move with the other of said rollers, a balancing wire wound on said pulleys, and a tension spring biasing said one pulley relative to said one roller to maintain tension between said balancing wire and said ribbon.

3. Apparatus according to claim 1 in which the speed-indicating element and one of said rollers are mounted coaxially.

4. Apparatus according to claim 1 in which the speed-indicating element comprises a magnetic speed cup.

5. In an apparatus according to claim 1, a cylinder fixed to the speed-indicating element around which is wound the balancing wire intermediate of its end for transmitting the angular displacement of said speed-indicating element to the ribbon.

6. Apparatus according to claim 1, in which the rollers and the speed-indicating element are mounted at an angle to each other.

References Cited in the file of this patent

UNITED STATES PATENTS

| | | |
|---|---|---|
| 1,147,329 | Leathers | July 20, 1915 |
| 1,215,209 | Simpson | Feb. 6, 1917 |
| 1,409,134 | Butterfield | Mar. 7, 1922 |
| 1,901,710 | Flaherty | Mar. 14, 1933 |
| 2,154,406 | Marholz | Apr. 11, 1939 |
| 2,451,032 | Kingman | Oct. 12, 1948 |
| 2,759,447 | Helgeby | Aug. 21, 1956 |
| 2,804,041 | Neugass | Aug. 27, 1957 |

FOREIGN PATENTS

| | | |
|---|---|---|
| 17,340 | Germany | Feb. 9, 1956 |
| 926,329 | Germany | Apr. 14, 1955 |
| 17,435 | Great Britain | June 16, 1904 |
| 532,139 | Great Britain | Jan. 17, 1941 |
| 545,314 | Great Britain | May 19, 1942 |